(12) United States Patent
Reischmann et al.

(10) Patent No.: US 12,446,729 B2
(45) Date of Patent: Oct. 21, 2025

(54) MULTI-LAYER COOKING LID

(71) Applicant: Kenyon International, Inc., Clinton, CT (US)

(72) Inventors: Michael Reischmann, Eustis, FL (US); Phillip Williams, Clinton, CT (US); Jon Mosey, Westbrook, CT (US); Max Caro, East Haven, CT (US); Scott Schneider, East Lyme, CT (US)

(73) Assignee: Kenyon International, Inc., Clinton, CT (US)

( * ) Notice: Subject to any disclaimer, the term of this patent is extended or adjusted under 35 U.S.C. 154(b) by 52 days.

(21) Appl. No.: 17/391,710

(22) Filed: Aug. 2, 2021

(65) Prior Publication Data

US 2022/0031119 A1 Feb. 3, 2022

Related U.S. Application Data

(60) Provisional application No. 63/060,306, filed on Aug. 3, 2020.

(51) Int. Cl.
  *A47J 37/07* (2006.01)
  *A47J 36/04* (2006.01)
  *A47J 36/06* (2006.01)

(52) U.S. Cl.
  CPC ............ *A47J 37/0786* (2013.01); *A47J 36/04* (2013.01); *A47J 36/06* (2013.01)

(58) Field of Classification Search
  CPC .......... A47J 36/04; A47J 36/06; A47J 37/067; A47J 37/07; A47J 37/0786
  See application file for complete search history.

(56) References Cited

U.S. PATENT DOCUMENTS

| | | | | |
|---|---|---|---|---|
| 1,408,692 A | * | 3/1922 | Curtis | A47J 36/06 |
| | | | | 126/374.1 |
| 4,165,683 A | * | 8/1979 | Van Gilst | A47J 37/0704 |
| | | | | 99/393 |
| 4,434,781 A | * | 3/1984 | Koziol | A47J 37/0713 |
| | | | | 236/1 G |

(Continued)

FOREIGN PATENT DOCUMENTS

| | | | | |
|---|---|---|---|---|
| CA | 2315566 A1 | * | 2/2001 | .......... A47J 37/0786 |
| CN | 2204143 Y | | 8/1995 | |
| WO | WO-2014041334 A2 | * | 3/2014 | .......... A47J 37/0704 |

OTHER PUBLICATIONS

International Search Report and Written Opinion for PCT/US2021/044264 dated Nov. 4, 2021.

(Continued)

*Primary Examiner* — Michael G Hoang
*Assistant Examiner* — Logan P Jones
(74) *Attorney, Agent, or Firm* — Farber LLC

(57) ABSTRACT

A cooping appliance which has a multi-layer lid, the lid preferably includes three spaced layers and venting between the outer and middle layers such that the outer most layer remains cooler to the touch compared to prior art grills. The lid preferably can comprise materials of relatively low melting points or burning points such as polymers or leather or wood or other decorative materials which ordinarily would get too hot on a grill lid. The outer layer is preferably curved in shape with the middle and inner layers formed from a number of straight sections with bends therebetween.

10 Claims, 3 Drawing Sheets

(56) References Cited

U.S. PATENT DOCUMENTS

| | | | |
|---|---|---|---|
| 5,406,930 A * | 4/1995 | Ragland | A47J 37/0704 |
| | | | 126/41 R |
| 5,582,095 A * | 12/1996 | Rial | A47J 47/14 |
| | | | 296/22 |
| 6,104,004 A * | 8/2000 | Ragland | A47J 37/0635 |
| | | | 99/450 |
| 6,357,344 B2 | 3/2002 | O'Grady et al. | |
| 8,662,068 B2 | 3/2014 | Ahmed | |
| 9,204,657 B2 | 12/2015 | Cusack | |
| 9,433,322 B2 | 9/2016 | Axinte et al. | |
| 9,468,337 B2 | 10/2016 | Simon et al. | |
| 9,756,980 B1 | 9/2017 | Li et al. | |
| 9,930,991 B2 | 4/2018 | Traeger | |
| 10,485,245 B2 | 11/2019 | Ahmed | |
| 10,495,315 B2 | 12/2019 | DeMars et al. | |
| 10,568,460 B2 | 2/2020 | Li et al. | |
| 10,578,313 B2 | 3/2020 | Reischmann | |
| 2005/0155596 A1 * | 7/2005 | Andrews | F24B 1/207 |
| | | | 126/41 R |
| 2008/0060633 A1 * | 3/2008 | Antwine | A47J 36/06 |
| | | | 126/25 R |
| 2010/0124596 A1 * | 5/2010 | Nelson | A23L 5/15 |
| | | | 426/523 |
| 2010/0258106 A1 * | 10/2010 | Simms, II | A47J 37/0763 |
| | | | 126/25 R |
| 2012/0012096 A1 | 1/2012 | Cusack | |
| 2013/0087136 A1 * | 4/2013 | Ahmed | A47J 37/0713 |
| | | | 126/39 E |
| 2014/0311356 A1 | 10/2014 | Daniels | |
| 2018/0360268 A1 | 12/2018 | Schlosser et al. | |

OTHER PUBLICATIONS

Fenne, Mark; Siummitt Charcoal Grill; Weber; 2020.

Caliber Pro Stainless Steeel Kamado Grill; Product information; https://www.theoutdoorappliancestore.com/product/caliber-pro0stainless-steel-kamado-grill-black/. Retrieved from internet on Jun. 4, 2020.

Royal Gourmet Mirage MG6001-R Two Split Lid 6-Burner Cabinet Propane Infrared Burner Gas Grill, Side Burner, 96,000 BTU, Stainless Steel; Prodcut Informaiton; Amazon.com; https://www.amazon.com/Royal-Gourmet-MG6001-R-6-Burner-Stainless/dp/B07N75R411; retrieved from internet Jun. 4, 2020.

* cited by examiner

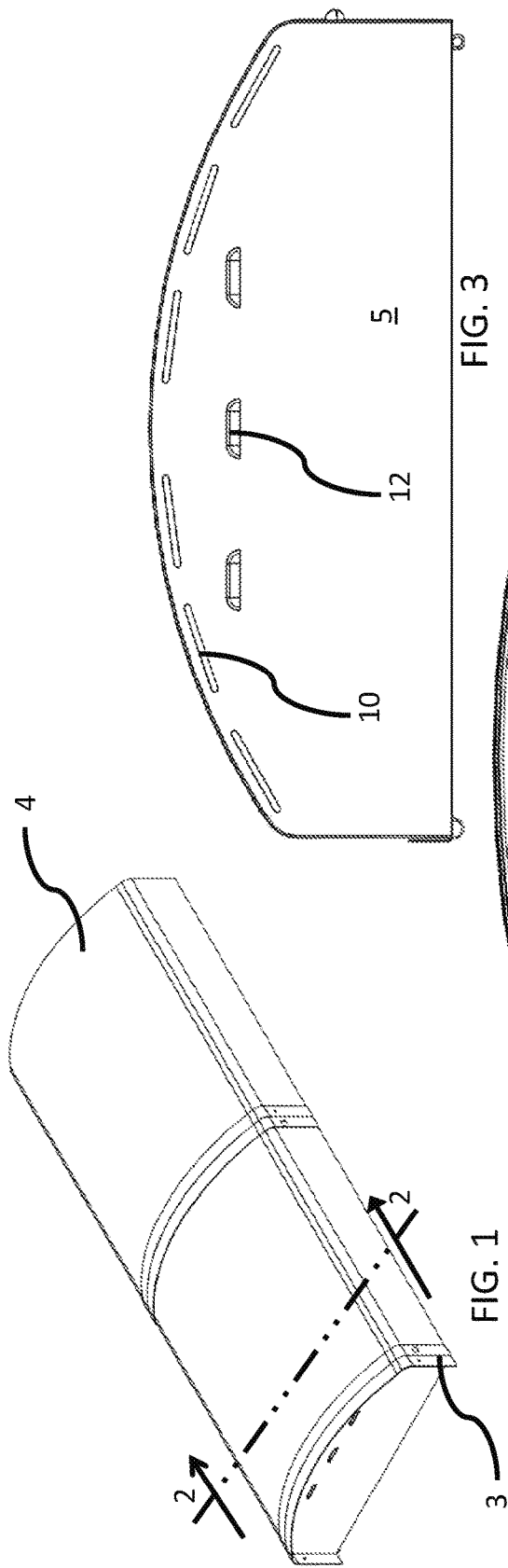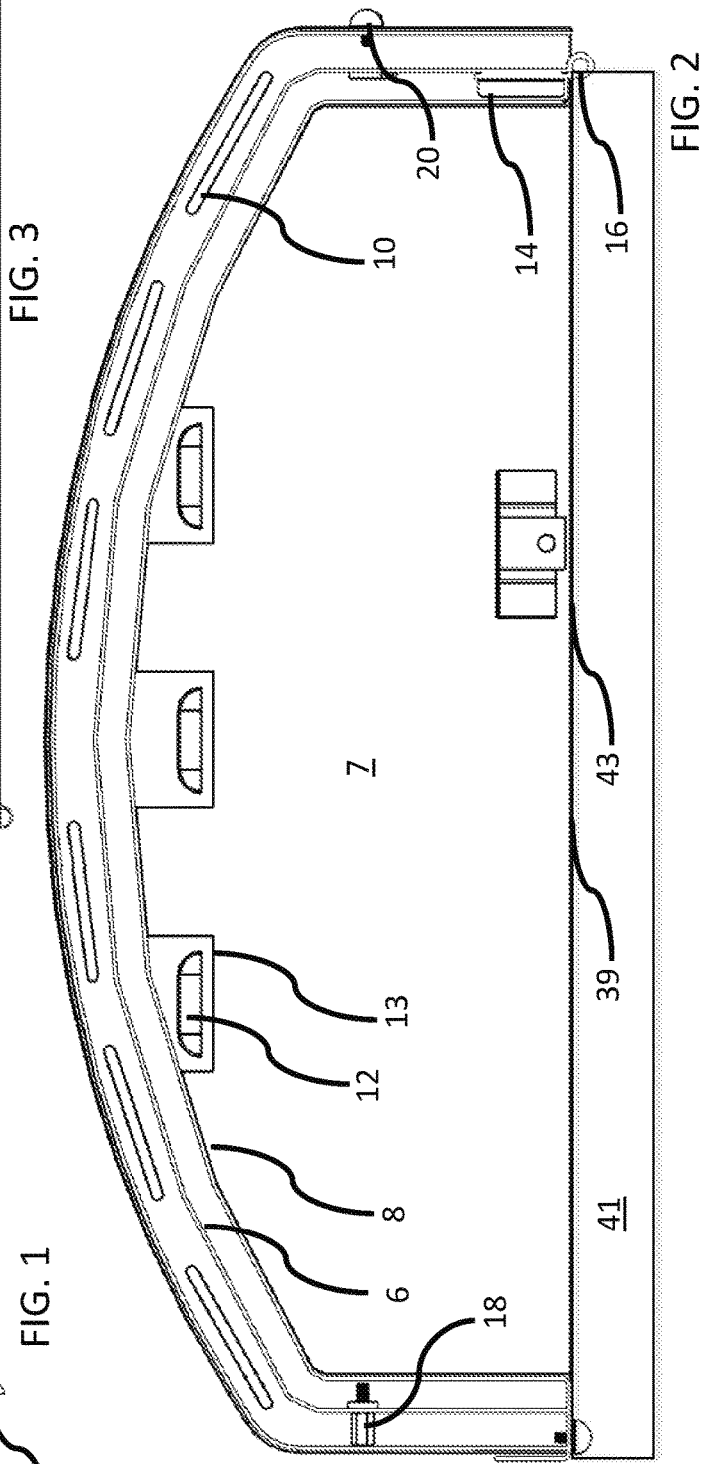

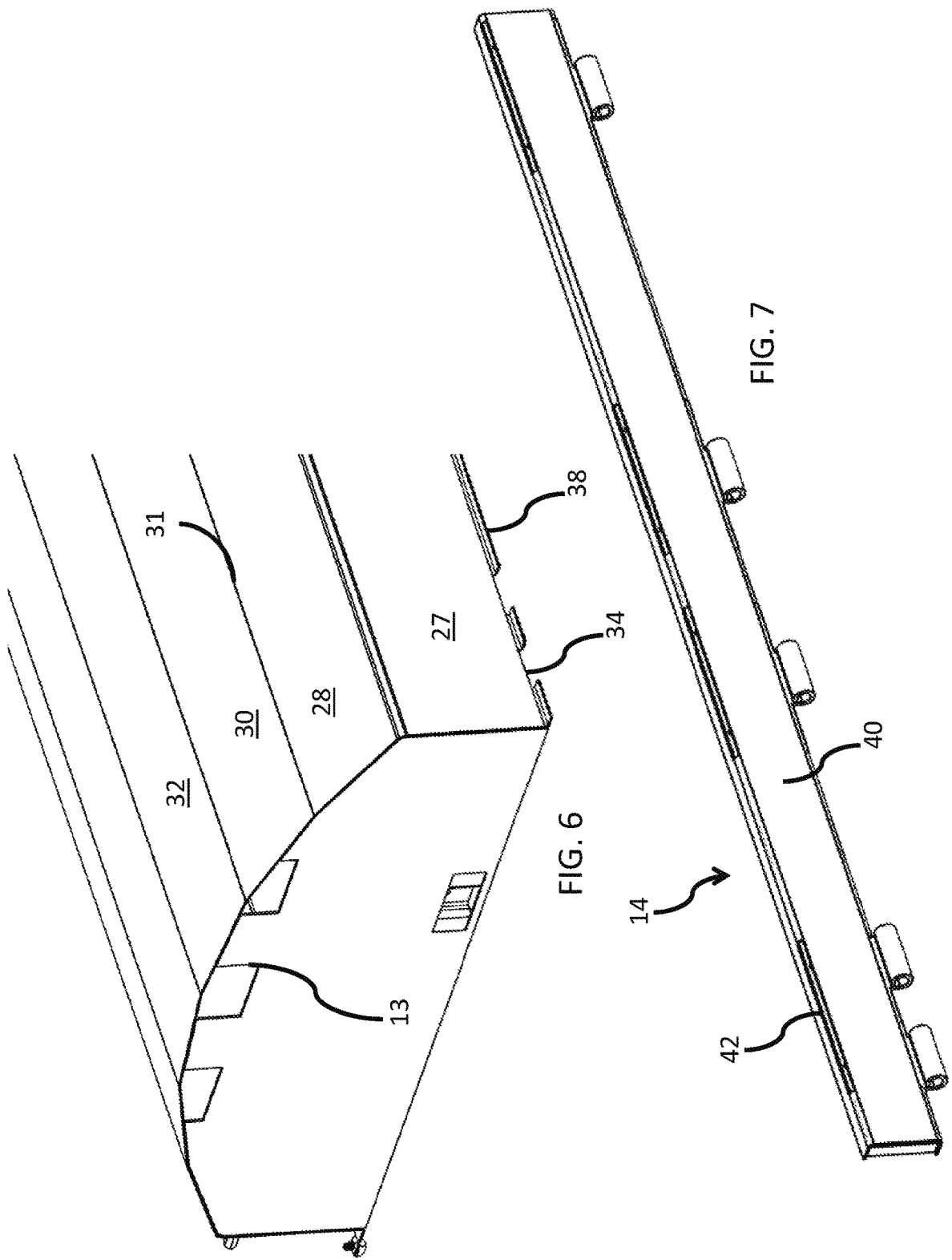

MULTI-LAYER COOKING LID

FIELD OF THE INVENTION

The following relates to cooking appliances and cooking lids, and more specifically to grill and cooktops with a multi-layer lid.

BACKGROUND OF THE INVENTION

Cooking lids are commonly used to trap heat within a cooking area. On stovetops, lids are used, for example, to more quickly boil water or to trap moisture in a cooking vessel. On a grill or cooktop, lids are used equally to trap heat/moisture within the cooking area. These lids are often made of a single ply material which although effective at trapping heat, suffers the disadvantage that the lid itself can be very hot to touch on the outside during use and after use for a moderate amount of time. As a result, the material used for the lid must be able to withstand melting temperatures high enough so that the lid does not deform during normal use and the associated temperatures. The result is that the outer surface of the lid does not have much flexibility in terms of material selection or aesthetic design.

Many outdoor grills are made of a single layer of stainless steel or other metal and while relatively effective at trapping heat, the metal is still a good conductor and there is a significant amount of heat loss as a result. At the same time, touching the outer surface of most grills is almost certain to result in burns.

SUMMARY OF THE INVENTION

What is therefore desirable is to provide a cooking lid whose outer surface can remain at temperatures lower than prior art lids, preferably those temperatures that are not overly hot to the human touch and which do not cause burning.

It is therefore an object of the present invention to provide a cooking lid of multiple spaced layers.

It is another object to provide a cooking lid whose outer surface includes a different material than the inner surface.

It is another object to provide a cooking lid whose outer surface is made from or includes materials with comparatively lower melting temperatures or burn temperatures.

It is another object to provide for efficient manufacturing of a multi layered cooking lid.

These and other objects are achieved by providing a multi-layer lid for a grill, the lid preferably includes three spaced layers and venting between the outer and middle layers such that the outer most layer remains cool to the touch relative to prior art grills. The lid preferably can comprise materials of relatively low melting points such as polymers or other decorative materials which ordinarily would get too hot on a grill lid. Other materials used on the outer layer may not have a melting point but may have a point at which they burn, for example, wood, leather or other decorative materials. The outer layer is preferably curved in shape with the middle and inner layers formed from a number of straight sections with bends therebetween. In other aspects, the outer layer may comprise materials which may be suited to high temperatures but are used for decoration such as ceramics. In this case, the benefit of the outer layer remaining comparatively cool provides added protection against burn injuries to persons who inadvertently touch the lid.

In certain aspects a grill includes a cooking surface and a lid. The lid is configured to cover the cooking surface and includes at least three layers spaced apart such that facing surfaces of two of the at least three layers are not in contact along majority of the facing surfaces. Each layer includes a bottom edge and each layer defining a hollow shape. At least one of the three layers includes a different material with a lower melting point or burning point than a material which makes up another one of the at least three layers.

In certain aspects the at least three layers include a first layer which is an inner layer, a second layer which is an interior layer and a third layer which is an outer layer. Vents are positioned to allow air flow between the second and third layers and a space between the first layer and second layer has less venting as compared to a space between the second and third layer due to the vents. In certain aspects the space between the first layer and second layer is sealed. In certain aspects the space between the first layer and second layer has less than 20% of an amount of venting as compared to the space between the second layer and third layers. In other aspects the at least three layers include a first layer which is an inner layer, a second layer which is an interior layer and a third layer which is an outer layer, one or more of the first and second layers includes bends therein to create at least four flat sections. In yet other aspects the bottom edge is part of a rectilinear perimeter and a hinge is attached to the lid to allow the lid to pivot between open and closed positions relative to a grill.

In other aspects the cooking lid is provided with a first layer having a bottom edge and a hollow shape, the hollow shape defined by upwards extending portions and at least two flat portions between the upwards extending portions such that each flat portions has a bend on either side thereof in the first layer.

In certain aspects the lid has a second layer and a third layer, both including a hollow shape. The second layer is spaced from the flat portions of the first layer and the third layer spaced from the second layer to create two air spaces. A first one of the two air spaces is between the first and second layers and a second one of the two air spaces is between the second and third layers. The second and third layers are arranged outwards with respect to the first layer. In certain aspects the lid includes vents which vent the second air space, the vents defining a vent area. In other aspects the vent area is greater than an amount of vent area in the first air space. In still other aspects the first air space is generally sealed.

In other aspects a grill is provided including a cooking surface and a lid configured to cover said cooking surface. The lid includes an assembly of at least three layers secured together with spaced apart facing surfaces such that the facing surfaces of each of the at least three layers are not in contact along a majority of their surface areas. Each layer includes a bottom edge and each layer defines a hollow shape. A first of the at least three layers is an inner layer, a second of the at least three layers is a middle layer and a third of the at least three layers is an outer layer. The middle layer is positioned between the outer and inner layers and the first layer is positioned at least partially within hollow shape of the second and third layers.

In certain aspects a sidewall layer is secured to the assembly and a vent is provided in the sidewall layer. In certain aspects the vent is located to vent an interior space between the first and second layers to an external environment. In yet other aspects the sidewall layer is provided without vents between the first and second layers. In other aspects the vent is positioned between a lower edge of the sidewall layer and the first layer. In certain aspects the vent comprises a plurality of vents. In still other aspects the third layer includes a non-metallic material which is different from a material which makes up another one of the at least three layers. In still other aspects the non-metallic material has a lower melting point or burning point than the material which makes up the another one of the at least three layers. In still other aspects the non-metallic material is polymeric. In still other aspects the third layer is curved along a majority of its surface area and the first and/or second layers include a plurality of straight sections with bends therebetween.

In certain aspects a cooking lid is provided with at least three layers spaced apart such that facing surfaces of two of the at least three layers are not in contact along majority of the facing surfaces, preferably along at least 60%, 75% or even 85% or more of facing surfaces are not in contact. Each layer includes a bottom edge and the layer defines a hollow shape. At least one of the three layers includes a different material with a lower melting point than a material which makes up another one of the at least three layers, preferably a melting point at least half as high as that of another of the layers.

In other aspects the space between the first layer and second layer as measured by cross section area has less than 20% of an amount of venting as compared to the space between the second layer and third layers as measured by cross section area. In certain aspects the vent area is at least four times greater than an amount of vent area in the first air space. In certain aspects the first air space is sealed.

Other objects of the invention and its particular features and advantages will become more apparent from consideration of the following drawings and accompanying detailed description.

BRIEF DESCRIPTION OF THE DRAWINGS

FIG. 1 is a perspective view of a lid according to an embodiment of the present invention.

FIG. 2 is a cross section of FIG. 1 along line 2-2.

FIG. 3 is a side view of FIG. 1 showing the lid installed on a grill.

FIG. 6 is another detail perspective view of FIG. 1 with additional parts removed/not shown as compared to FIG. 5.

FIG. 7 is a perspective view of a sub-assembly component of FIG. 1.

DETAILED DESCRIPTION OF THE INVENTION

Figures 4, 5:
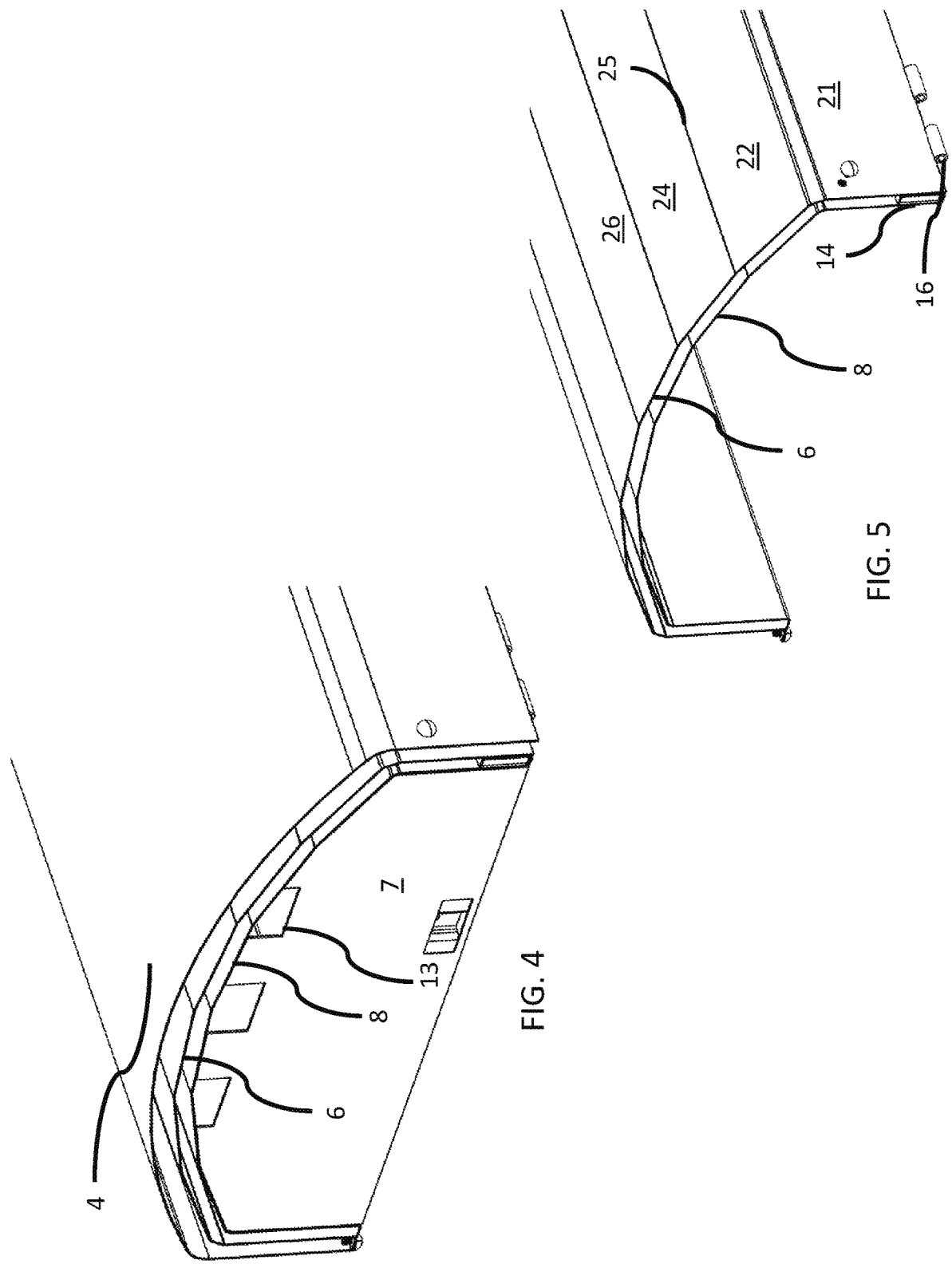
FIG. 4 is a detail perspective view of FIG. 1 with certain parts removed/not shown.
FIG. 5 is another detail perspective view of FIG. 1 with additional parts removed/not shown as compared to FIG. 4.

Referring now to the drawings, wherein like reference numerals designate corresponding structure throughout the views. The following examples are presented to further illustrate and explain the present invention and should not be taken as limiting in any regard.

FIG. 1 shows a grill lid which is optionally a split lid with two separately openable sections for different cooking zones. It is understood that a single lid (without the split) is also contemplated. The outer layer 4 is depicted as generally including vertical sides and a domed top which may be curved as shown on the outer surface. The material that makes up the outer layer may be of a different material than the inner layers 6/8. In certain aspects, the outer layer is comprised of polymers/plastics, fiber reinforced plastics or the outer layer 4 may have a decorative design such as a vinyl wrap or hydro dipped decoration or sublimated plastics. Other materials which include comparatively lower melting points in relation to e.g. stainless steel are contemplated, preferably materials which have a melting point half that of stainless steels or even one quarter is contemplated. Optionally, the vinyl wrap or hydro dip or other decorative coating may be applied to a metal base layer to create the outer layer 4 which includes at least one of those materials of a comparatively lower melting point. Preferably this material of a lower melting point may cover at least 20% of the surface area of the outer layer and preferably at least 30% and more preferably at least 50% and even more preferably at least 75% of the outer layer's surface area.

The facing surfaces of the various layers of the lid are spaced apart, specifically at least a majority of the surface area of the facing surfaces are spaced apart and more preferably more than 75% of the surface area of facing surfaces are spaced apart. The result is a cavity between facing layers which provides added insulation and inhibits heat transfer to the outer most layer.

As shown in FIG. 2, the end plate 5 (FIG. 3) is removed to show the internal layering of the cooking lid. The lid as shown includes three layers 4/6/8. The middle 6 and inner layers 8 create a generally sealed air space between the layers and the end plates 5. Interior end plate 7 provides vent holes 13 which allow vents 12 on the end plate 5 to vent to the outside environment. This allows e.g. smoke to escape. As shown, vents 12 are positioned between the inner layer 8 and the lower edge 39 of the end plate 5 of the lid. Between inner layer 8 and middle layer 6, a support bar 14 is provided to stiffen the area along the hinges 16 and to also support the hinges. The hinges are mounted to corresponding hinges at the rear of the grill/griddle surface along the rear edge of the grill and allow the lid to rotate around an axis to open/close the lid. Support bar 14 may be a generally "C" shaped channel with a number of cutouts. Between the middle layer 6 and the outer layer 4, vents 10 are provided on the end plate 10. These vents ensure that the air space between the middle and outer layers is well vented and that heated air can escape easily. In contrast, the space between middle 6 and inner 8 layers does not have the same venting and is generally sealed or substantially more restricted in terms of air flow. As shown, this generally sealed space is provided without venting e.g. without intentionally added cutouts from venting. It is understood that this generally sealed area may not be perfectly sealed in that manufacturing and welding/assembly of the lid is not designed to create a completely airtight volume in contrast to the added venting 10 in the other air space which includes added cutouts. It is understood that a perfect air tight seal is generally not created as there will necessarily be some areas that do not seal during manufacturing, but that a generally sealed space does not include venting making up more than 5% of any particular face of the sealed volume. This creates a well-insulated air space between the middle 6 and inner 8 layers to both better trap heat and to decrease the temperature of the middle layer 6 which thus results in the air space between middle 6 and outer 4 layers being lower. As a result, the outer layer 4 can include a material of a much lower melting point and the outer layer 4 will not be as hot to the touch as compared to other cooking lids such as grill lids.

Straps 3 are provided to connect the outer layer 4 to the end part 5. Preferably, the straps 3 are made of a material more resistant to heat than the outer layer 4. As shown, screws 20 and threaded sections 18 are provided to attach the straps 3. The threaded section 18 may be provided by a rivnut installed in a hole in the middle layer 6. In certain embodiments the straps are made of the same material as the interior layers 6/8, which may be stainless steel or another metal. The lid is shown in FIG. 3 as part of a grill where the grill body 41 includes a cooking surface 43.

Referring to FIG. 4, additional detail concerning the interior end part 7 is shown in that that part is recessed with respect to the end of the layers 4/6/8. This recessing creates another air space which although not completely sealed due to vents 13/12, does provide additional insulation to the lid. In FIG. 5 the outer layer 4 has been removed and the middle layer's flat sections 22, 24, 26 are shown with bends 25 between adjacent sections. A generally vertical and flat sidewall 21 is also provided and as shown there is a bend (two shown) to get from the vertical section 21 to the first crossing section 22 which crosses the opening between the two vertical sections on the lid. This upwards, over and then downwards shape creates an interior hollowed out shape which can be considered concave even if made from multiple flat sections. These flat sections 22/24/26 are provided to ease manufacturing in that providing a curved or domed top in metal involves a much more complex manufacturing process of rolling and fitting parts and is more involved than what is shown. Specifically, a simple press break or bending machine can be used to progressively bend the middle layer 6 (and inner layer 8 for that matter) in order to create the concave/hollow shape of the inside of the lid. In contrast, a curved section involves a roller bending machine which may include adjustable radiuses and generally, the process of making the curved shape results in more complicated tolerances. While rolling may work for single layer grills, the added complexity of using multiple layers and needing those layers to be spaced in a relatively accurate manner means that the flat sections may be preferable for at least the middle layer 6. Furthermore, the vents 10 are shown as generally straight sections and it can be easier to align the venting with the desired areas between layers if at least one layer is straight. It is further contemplated that the inner layer 8 might include a curved/domed top or the multiple flat section top as shown in the drawings. Support channel 14 is shown along with hinge 16 between the vertical section 21 of the middle layer and the vertical section 27 of the inner layer (See FIG. 6).

The inner layer as shown in FIG. 6 includes the vertical section 27 along with flat sections 28/30/32 with bends 31 between the flat sections similar to the middle layer as shown and described with respect to FIG. 5.

The bends 25/31 between the various flat sections disclosed herein may be different degrees. Specifically, the first angle of bend between the vertical section 27 and its adjacent flat section may be the largest of the bends, the next, second, bend between 30/28 may be roughly in the range of 3-20% as large as the first bend and then the third bend between 28/26 may be slightly larger than the second bend, for example in the range of 5-30% larger and then the bends repeat in a mirror arrangement. In certain embodiments, the first bend may be two dose together bends which account for the total angle of the first. The bends are dose together in that they are spaced narrower than any one of the flat sections, preferably spaced less than 20% of a width of any of the flat sections. In certain embodiments the first bend (or the sum of the two close together bends) is in the range of 40-70 degrees. The second bend is in the range of 5-20 degrees (about ⅛-¼ of the first bend) and the third bend is in the range of 6-30 degrees (about 1-1.5× the second bend). This relationship of the angles disclosed herein and more specifically in this paragraph applies to both the inner 6 and middle 8 layers and their corresponding flat sections and bends.

FIG. 7 shows the support channel 14 which includes slots 42 cut in the "C" shaped channel. The slots 42 receive the hinges 16 which are then spot welded in place. The inner layer as shown in FIG. 6 includes tabs 38 and openings 34 in the tab 38. These openings 34 receive the rounded ends of the hinges so that these parts protrude below the bottom edge of the grill lid so that the hinges can connect with a pin to a corresponding part of the grill body. The tab supports the channel 14 as well which provides rigidity to the overall structure.

The lid in the depicted embodiments disclosed herein may be specifically adapted for use with indoor or outdoor grills and provides the ability to better customize the look of the outer surface in that the material will not get as hot due to the inner two layers providing insulation and the vents between the middle and outer layers keeping the outer surface cool to the touch relative to prior art grills which will often cause burns when touched. The result of lowering the outer temperature is that materials such as carbon fiber weave, carbon/fiberglass weave or other fiber reinforced plastics or plastics/polymers can be used on the grill cover to provide a decorative and aesthetically pleasing look which will not melt under normal grill operating temperatures. Additionally, stickers and vinyl wrapping and/or plastics which are sublimated can be used for the grill's outer surface which again provides for more customized design options and personalization in that many of these decorative surfaces would not normally be suitable for use in grill covers in that they would be likely to melt or significantly soften under normal use conditions of grills which will often see temperatures inside the grill hood in excess of 500 deg F. As a result of the multi-layer design, the outer surface of the grill lid will typically stay below 180 deg F, preferably below 150 deg F, and even more preferably below 120 deg F, even when the inside of the grill reaches 500 deg F inside the grill lid and the outside temperature is 85 deg F.

It is specifically contemplated that the scope of the disclosure extends beyond lids for grills and more specifically that the cooking lid design disclosed herein could be adapted into a multi-layer lid for common household cookware with three spaced layers and venting between the middle and outer layers to result in a cooking lid in which the outer layer does not get as hot and provides an added safety factor.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A grill comprising:
   a cooking surface;
   a lid which is configured to cover the cooking surface, said lid including at least three layers spaced apart such that there are two air spaces, one air space on either side of a middle one of the at least three layers and at least one of the layers is an inner most layer of the lid and at least one of the layers is an outer most layer of the lid, the at least three layers spaced apart such that facing surfaces of two of the at least three layers are not in contact along majority of the facing surfaces to define one or more of the two air spaces, each layer including a bottom edge and each layer defining a hollow and concave shape on a side of each layer which is configured to face the cooking surface such that the two air spaces are also concave in shape on a side facing the cooking surface, wherein the three layers are secured relative each other at or adjacent the bottom edge to create a lid assembly;

the outer most layer of the lid includes a different material with a lower melting point or burning point than a material which makes up another one of the at least three layers such that the material with the lower melting point or burning point faces outwards.

2. The grill of claim 1 wherein the at least three layers include a first layer which is an inner layer, a second layer which is an interior layer and a third layer which is an outer layer and further comprising:

a vent positioned in a sidewall of the lid at a height positioned between the second and third layers, the vent configured to allow air flow between the second and third layers wherein a space between the first layer and second layer has less venting as compared to a space between the second and third layer due to the vent.

3. The grill of claim 2 wherein the space between the first layer and second layer is sealed.

4. The grill of claim 2 wherein the space between the first layer and second layer has less than 20% of an amount of venting as compared to the space between the second layer and third layers.

5. The grill of claim 1 wherein the at least three layers include a first layer which is an inner layer, a second layer which is an interior layer and a third layer which is an outer layer, one or more of the first and second layers includes bends therein to create at least four flat sections, wherein one or more of the bends are spaced apart from their adjacent layer such that there is an air space between facing layers at the one or more of the bends.

6. The grill of claim 1 wherein the bottom edge is part of a rectilinear perimeter and a hinge is attached to the lid to allow the lid to pivot between open and closed positions relative to a grill.

7. A grill comprising:
   a cooking surface;
   a lid configured to cover said cooking surface, the lid comprising an assembly of at least three layers secured together with spaced apart facing surfaces such that the facing surfaces of each of the at least three layers are not in contact along a majority of their surface areas to define two air spaces, each layer including a bottom edge and each layer defining a hollow shape;
   a first of the at least three layers is an inner layer which is an inner most layer of the lid;
   a second of the at least three layers is a middle layer;
   a third of the at least three layers is an outer layer which is an outer most layer of the lid and the middle layer is positioned between the outer and inner layers and the first layer is positioned at least partially within hollow shape of the second and third layers so that a convex outward facing surface of the middle layer faces and is spaced apart from a concave inner surface of the outer layer and so that a convex outward facing surface of the inner layer faces and is spaced apart from a concave inwards facing surface of the middle layer wherein a first of the two air spaces is between the inner and middle layers and a second of the two air spaces is between the middle and outer layers
   a sidewall layer secured to the assembly;
   a vent in the sidewall layer:
   wherein the vent is located in the sidewall layer at a location between the second and third layers to vent an interior space between the second and third layers to an external environment:
   wherein the third layer includes a non-metallic material which is different from a material which makes up another one of the at least three layers.

8. The grill of claim 7 wherein the non-metallic material has a lower melting point or burning point than the material which makes up the another one of the at least three layers.

9. The grill of claim 7 wherein the non-metallic material is polymeric.

10. A grill comprising:
    a cooking surface;
    a lid configured to cover said cooking surface, the lid comprising an assembly of at least three layers secured together with spaced apart facing surfaces such that the facing surfaces of each of the at least three layers are not in contact along a majority of their surface areas, each layer including a bottom edge and each layer defining a hollow shape;
    a first of the at least three layers is an inner layer;
    a second of the at least three layers is a middle layer;
    a third of the at least three layers is an outer layer and the middle layer is positioned between the outer and inner layers and the first layer is positioned at least partially within hollow shape of the second and third layers;
    wherein the third layer is curved along a majority of its surface area and the first and/or second layers include a plurality of straight sections with bends therebetween, the bends spaced from their adjacent one or more of the at least three layers.

* * * * *